Dec. 16, 1969     R. L. RODEN ET AL     3,484,807
BELT TENSION GAUGE CALIBRATION
Filed Nov. 3, 1967
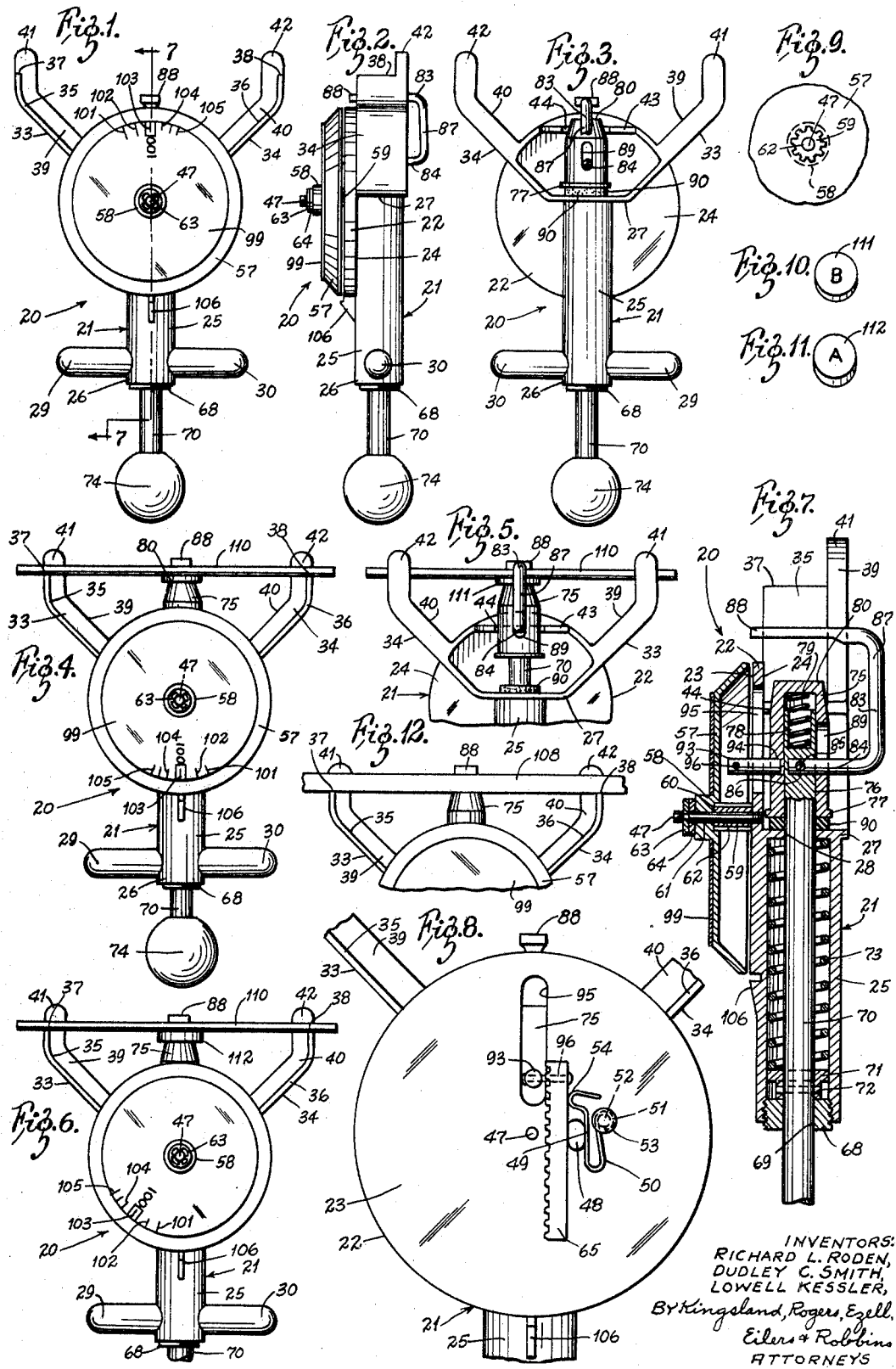
INVENTORS:
RICHARD L. RODEN,
DUDLEY C. SMITH,
LOWELL KESSLER,
By Kingsland, Rogers, Ezell,
Eilers & Robbins
ATTORNEYS United States Patent Office 3,484,807
Patented Dec. 16, 1969

3,484,807
BELT TENSION GAUGE CALIBRATION
Richard L. Roden and Dudley C. Smith, Dallas, Tex., and Lowell Kessler, Denver, Colo., assignors of two-thirds to John E. Mitchell Company, Dallas, Tex., a corporation of Missouri, and one-third to The Gates Rubber Company, Denver, Colo., a corporation of Colorado
Filed Nov. 3, 1967, Ser. No. 680,451
Int. Cl. G01c 17/38
U.S. Cl. 73—1                        4 Claims

ABSTRACT OF THE DISCLOSURE

A method of calibrating a spring-biased belt tension gauge for testing different belts of different design characteristics. Calibration is accomplished by deflecting a beam or anvil of known bending moment, juxtaposed with a selected shim, in the same manner as the test section of a belt is deflected. Different shim thicknesses are correlated to different belt characteristics.

BRIEF DESCRIPTION OF THE INVENTION

The belt tension gauge comprises a frame supporting fixed spaced stops and a central movable piston. The piston has a hook on one end and a knob on the other, is slidable within a cylinder carried by the frame, and is spring-biased. The frame supports an idicator, such as a rotatable calibrated dial. The piston is indirectly geared to the dial through a spring-biased top cap on the piston. The upper end of the top cap is spring-biased against the side of the belt opposite the hook.

Belt tension is determined by direct reading of the dial, which moves to a position related to the belt tension. Belt tension is sensed by the fixed, spaced stops restraining extremes of a belt section and the spring-biased hook centralized between the stops to flex the belt. The resultant deflection of the hook determines the position of the dial.

Calibration of the gauge is done by positioning an anvil of known beam elasticity where the belt would be positioned and locating the hook over the anvil. A shim selected according to the belt to be tested is positioned between the top cap and the side of the anvil opposite the hook, the top cap being depressed against its biasing spring by an amount determined by the thickness of the shim. Since the indicator is geared to the top cap, the position of the indicator is determined by both the location of the hook and the depressed position of the top cap. Different thicknesses of shims will produce different indicator readings as the anvil is deflected by the spring-biased hook, and the shim thicknesses are correlated to different belts specified for different belt installations.

Thus selection of the proper shim calibrates the gauge, and the calibrated gauge can be applied directly to an installed belt for verifying the correlation of the belt tension to the calibrated setting.

BRIEF DESCRIPTION OF THE DRAWING

FIGURE 1 is a front elevation view of the belt tension gauge;

FIGURE 2 is a side elevation view of the belt tension gauge;

FIGURE 3 is a rear elevation view of the tension gauge;

FIGURE 4 is a tront elevtaion view of the tension gauge shown with a test anvil and one thickness of shim and with the gauge properly calibrated;

FIGURE 5 is a fragmentary rear elevation view of the gauge as shown in FIGURE 4;

FIGURE 6 is a fragmentary front elevation view of the belt tension gauge with the test anvil and another thickness of test shim in place and showing the gauge in uncalibrated condition;

FIGURE 7 is an enlarged fragmentary view in section taken along the line 7—7 of FIGURE 1;

FIGURE 8 is a fragmentary front elevation view of the belt tension gauge with the dial plate removed;

FIGURE 9 is a fragmentary rear elevation view of the dial plate showing the pinion connected thereto;

FIGURE 10 is an isometric view of one test shim;

FIGURE 11 is an isometric view of another test shim; and

FIGURE 12 is a fragmentary front elevation view of the gauge testing the tension of a belt.

DETAILED DESCRIPTION OF THE INVENTION

The belt tension gauge 20 with which the calibration method of this invention may be practiced, comprises a frame 21 preferably of cast metal. The frame 21 has a circular, vertical base 22 that has front and rear sides 23 and 24 (see FIGURE 7). A hollow cylinder 25 is positioned adjacent the rear side 24 of the base 22. The lower end 26 of the cylinder 25 has internal threads and the upper end is covered by a flat plate section 27 that has a hole 28 through it. There are laterally extending grips 29 and 30 adjacent the lower end of the cylinder 25.

The lateral sides of the plate 27 are joined to angularly upwardly extending arms 33 and 34. The arms 33 and 34 have forwardly extending plate sections 35 and 36 that terminate in upper horizontal shoulders 37 and 38, respectively, and rearward plate members 39 and 40 having stop extensions 41 and 42, respectively, extending above the shoulders 37 and 38. The frame 21 may also include a reinforcing cross member 43 having a central opening 44 in it.

A pin 47 is affixed to the center of the circular base 22 and projects forwardly of the front wall 23 thereof. Spaced laterally of the pin 47, there is a forwardly projecting lug 48. A side 49 of a leaf spring 50 bears against one side of the lug 48. One end 51 of the leaf spring 50 is anchored to a pin 52 that is affixed to the base 22. The pin 52 has a head 53 that holds the spring 50 in place. At its other end, the spring 50 has a rounded bearing section 54.

A dial plate 57 is molded with a central forwardly projecting hub 58. A pinion gear 59 is tightly mounted within a recess 60 in the rear side of the dial plate 57 and the hub 58. The hub 58 and the pinion 59 have coaxial holes 61 and 62 through them, enabling the dial plate 57 to be mounted on the pin 47, to be held in place by a conventional snap lock 63 bearing against a washer 64. A toothed rack 65 is positioned against the lug 48 with its teeth 66 in mesh with the teeth of the pinion gear 59. The intermesh of the rack 65 with the pinion 59 is aided by the bearing section 54 of the leaf spring 50.

A bushing 68 is threaded into the lower end of the cylinder 25. The bushing 68 has a hole 69 through it. A piston 70 extends through the bushing 68, the cylinder 25 and the hole 28 in the plate 27. A collar 71 is suitably affixed to the piston 70, such as by a pin 72. The collar 71 acts as a lower seat for a compression spring 73, the upper end of which bears against the plate 27. The compression spring 73 normally biases the piston 70 downwardly until the collar 71 is stopped against the bushing 68. A plastic knob 74 is threaded onto the lower end of the piston 70.

A metal cap 75 has a recess 76 extending upwardly from its end 77 enabling the cap 75 to be mounted on the upper end of the piston 70. There is a recess 78 in the upper end of the piston 70 for receiving a compression spring 79 that bears against the end wall 80 of the recess 78 and biases the cap 75 upwardly.

A rod 83 is bent with a lower horizontal end 84 locked by a pin 85 in a lateral slot 86 in the piston 70. The rod 83 has an upwardly extending vertical section 87 and an upper flattened horizontal hook section 88. The cap 75 has a vertical slot 89 in it through which the rod 83 projects. The lower end of the slot 89 defines the upper limit of movement of the cap 75 as biased by the compression spring 79. A rubber washer 90 is mounted on the piston 70 between the plates 27 and the base 77 of the cap 75. The rubber washer 90 cushions the downward movement of the piston 70 inasmuch as when the collar 71 reaches the bushing 68, the base 77 of the cap 75 reaches the rubber washer 90.

Another rod 93 is affixed within a hole 94 in the side of the cap 75. The rod 93 projects through a vertical slot 95 in the base 22. As shown in FIGURE 8, a pin 96 extends through the forward end of the rod 95 and through the upper end of the toothed rack 65.

The dial plate 57 carries an indicator dial 99 preferably of plastic sheet construction. The indicator dial 99 has indicator marks 101, 102, 103, 104 and 105, and others as necessary opposite to which there are marked numerical values corresponding to belt tension. The number 100 is drawn opposite the mark 103 and is the calibration reference. There is a lug 106 on the cylinder 25 relative to which the indicator marks 101–105 are compared. The indicator dial 99 is preferably held in place by a separable adhesive permitting removal and reorientation or replacement of the indicated dial 99.

OPERATION AND DESCRIPTION OF CALIBRATION AND BELT TESTING METHOD

Normally, the compression spring 73 biases the piston 70 downwardly to the position illustrated in FIGURE 7 which positions the rack 65 in the position illustrated in FIGURE 8, rotating the dial plate 57 to the position illustrated in FIGURE 1. To raise the piston 70 and rotate the dial plate 57, the gauge 20 is grasped with the first two fingers gripping the finger grip 29 and the second two fingers gripping the finger grip 30 and the knob 74 in the palm of the hand. When the hand grip is tightened, the piston 70 is raised, sliding vertically relative to the cylinder 25. When the piston 70 moves upwardly against the force of the compression spring 73, it raises the rod 83, including the upper horizontal hook section 88. Since the compression spring 79 always biases the cap 75 upwardly relative to the rod 70, the cap 75 is also moved upwardly, carrying the rod 93 with it. The pin 96 connected to the rod 93 causes the rack 65 to move upwardly, rotating the pinion 59 and therefore rotating the dial plate 57. If the dial plate 57 rotates, of course, the indicator dial 99 also rotates, moving the indicator marks 101–105 to different positions relative to the indexing lug 106.

In the method of this invention, the gauge 20 is calibrated using a metal anvil 110, which may be in the form of a rod, and a selected one of different shims, such as the shims 111 and 112 shown in FIGURES 10 and 11. The shims 111 and 112 are of different thicknesses corresponding to different belt thicknesses and the calibration kit may include additional shims of further different thicknesses.

First, the anvil 110 is centered between the shoulders 37 and 38 and against the stops 41 and 42. Then the piston 70 is raised and the anvil 110 is slid forwardly sufficiently to permit the hook extension 88 of the rod 83 to overlie the anvil. The anvil 110 is replaced against the stops 41 and 42 and the piston 70 is released, the compression spring 73 lowering the piston 70 until the hook member 88 bears against the upper central portion of the anvil 110. Next, one of the shims 111 or 112 is selected according to its correlation with the particular belt to be tested. The shims bear coding indicia so that the user will know which one to select. The indicator dial 57 is manually rotated and this rotates the pinion 59 and lowers the rack 65, causing the rod 93 to lower the cap 75 against the force of the compression spring 79 to produce enough space between the upper end of the cap 75 and the anvil 110 to permit the selected shim 111 to be inserted between the cap 75 and the anvil 110, as illustrated in FIGURE 4. Then the dial plate 57 is released, following which the compression spring 79 will raise the cap 75, causing its upper end to bear against the shim 111. However, because of the presence of the shim 111, the cap 75 will not be raised to the full limit permitted by the slot 89 but will stop against the shim 111. As the cap raises to the stop position, the dial plate 57 again rotates, moving the indicator marks 101–105. For proper calibration, the central indicator mark 103 corresponding to the number 100 marked on the indicator dial 99 should be opposite the indexing lug 106. If the gauge is not properly calibrated, as the example of FIGURE 6 illustrates, the indicator dial 99 is removed and replaced with one that is properly oriented so that the indicator mark 103 is directly opposite the indexing lug 106. Now the gauge is properly calibrated and the anvil 110 and shim 111 can be removed.

Application of the gauge 20 for testing the tension of a belt in its installed condition, to which it has been calibrated as just described, is easy. The piston 70 is raised against the force of the compression spring 78 and the shoulders 37 and 38 are positioned against the underside of a belt 108 (see FIGURE 12). The knob 74 is released to permit the compression spring 73 to press the hook extension 88 against the top of the belt 108. The dial plate 57 is manually rotated to position the cap 75 beneath the belt 108 and is released. Because the calibration shim 111 or 112 was correlated to the test belt 108, the final positions of the hook extension 88 and the cap 75 will produce a rotational position of the dial plate 57 which orients the indicator dial relative to the reference lug 106 according to the belt tension. The magnitude of belt tension is then read from which mark 101–105 (or others) is opposite the reference lug 106.

For different belts, calibration of the gauge followed by testing of a belt, are repeated according to the foregoing.

Various changes and modifications may be made within the purview of this invention as will be readily apparent to those skilled in the art.

What is claimed is:

1. A method of calibrating a belt tension gauge which has a spring-biased hook adapted to bear against a belt section, the ends of which are restrained by spaced stops and which has a cap spring biased relative to the hook to bear against the side of the belt opposite the hook, with a movable tension indicator positioned according to the positions of the hook and cap, comprising the steps of positioning an anvil of predetermined bending moment between the hook and the stops, positioning a shim calibrated to the thickness of the test belt between the anvil and the cap, releasing the cap to bear against the shim, and locating the indicator according to the deflection of the anvil and the spacing of the shim.

2. The method of claim 1 including the steps of testing the tension of an installed belt by removing the anvil and shim, locating the belt with one side bearing against the stops and the opposite side flexed by the hook, and with the cap biased against the said one side, to thereby determine the position of the indicator.

3. The method of claim 1 including the step of orienting the indicator to align it with the gauge in proportion to a predetermined correspondence with a test belt.

4. The method of claim 1 wherein the shim is one of a plurality of shims of different thickness calibrated to different belt thicknesses.

References Cited

UNITED STATES PATENTS

| 2,357,643 | 9/1944 | Floyd et al. | 73—1 |
| 2,996,914 | 8/1961 | Delehanty | 73—144 |

FOREIGN PATENTS

| 150,671 | 1962 | U.S.S.R. |

S. CLEMENT SWISHER, Primary Examiner